Nov. 4, 1947.  W. J. O'BRIEN  2,430,244
RADIO BEACON SYSTEM
Filed Oct. 7, 1946  3 Sheets-Sheet 1

INVENTOR
WILLIAM J. O'BRIEN
BY
Harold W. Mattingly
ATTORNEY

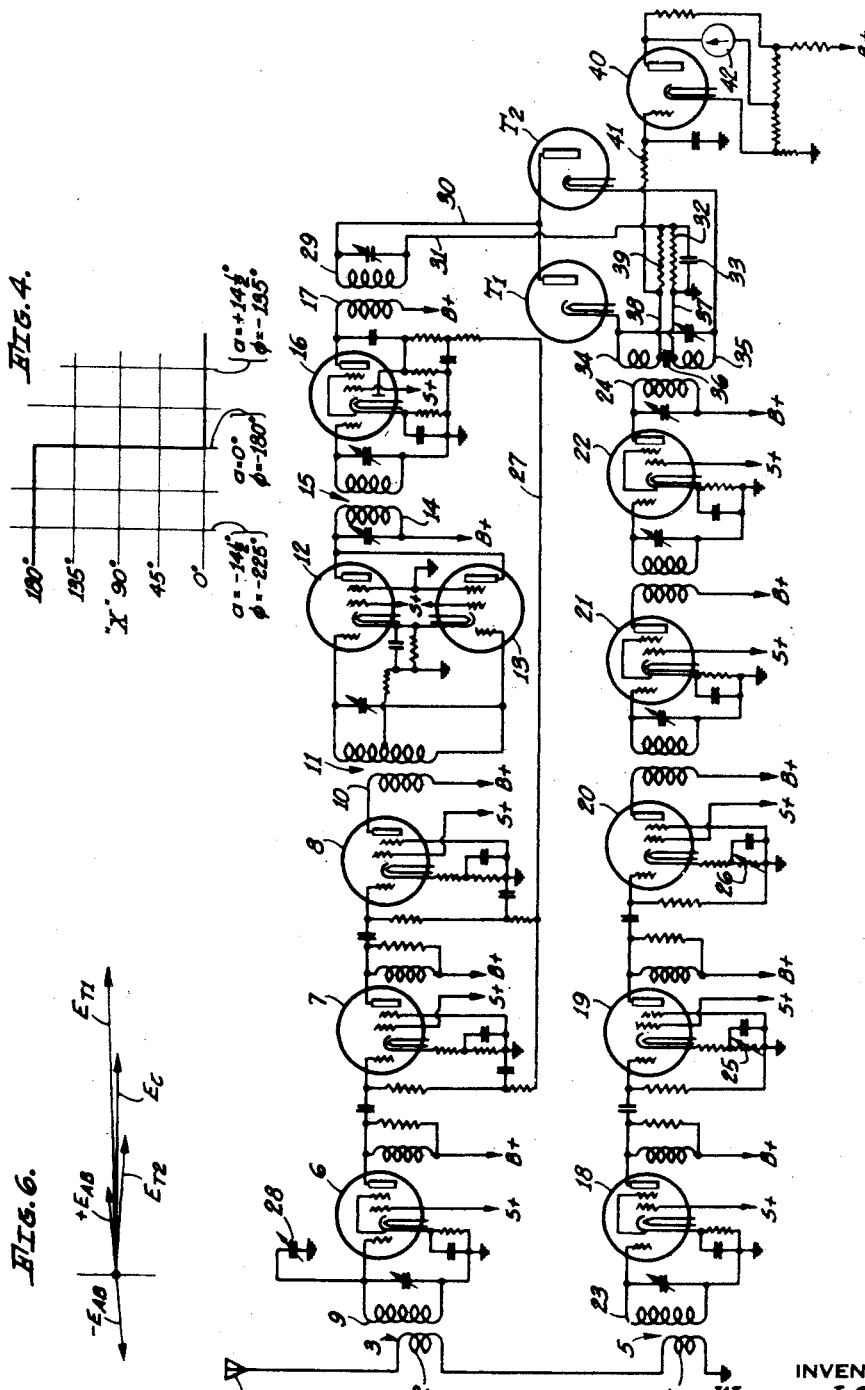

INVENTOR.
William J. O'Brien

Patented Nov. 4, 1947

2,430,244

UNITED STATES PATENT OFFICE 2,430,244

RADIO BEACON SYSTEM

William J. O'Brien, London, England, assignor to
The Decca Record Company, Limited, London,
England, a corporation of Great Britain Application October 7, 1946, Serial No. 701,746
In Great Britain June 4, 1941

9 Claims. (Cl. 250—11)

My invention relates to radio beacon systems and has particular reference to a radio beacon system which finds particular utility when employed as a navigation aid for aircraft or other vehicles or conveyances.

This application is a continuation-in-part of my copending application, Serial No. 421,374, filed December 2, 1941, and entitled "Radio beacon system."

In my copending application, Serial No. 420,059, filed November 22, 1941, and entitled "Radio beacon system," I have disclosed and claimed a new type of radio beacon system intended to overcome certain deficiencies and disadvantages found in the present commercial equi-signal beacon systems. The system disclosed in my copending application employs two or more transmitters operating on different but harmonically related frequencies and radiating signals which have a fixed multiple phase relation to each other. The indication of the location of a vehicle with respect to a desired course is afforded by determining the phase relationship between the signals received at the vehicle. In such a system the determined phase relation changes gradually from that corresponding to the selected course to a slightly different relationship if the vehicle wanders from the selected course.

The present invention is directed to a system similar to that above described but differing therefrom in that the phase relation of the received signals undergoes an abrupt and complete reversal as the vehicle is moved from one side of the selected course to the other. This system, in addition to providing many of the advantages provided by the system disclosed in my copending application, provides also a highly sensitive indication which serves to positively and unequivocally indicate to the pilot of the aircraft or other vehicle whenever the course of the vehicle deviates from the selected course even by an extremely small amount.

The present invention is particularly adapted to the guiding of bombing planes to a selected objective which is located many miles from the beacon transmitting equipment since under such circumstances an extremely sensitive and accurate course indication is necessary to insure the plane passing directly over the objective.

It is, therefore, an object of my invention to provide a radio beacon system which employs a plurality of beacon transmitters operating in synchronism to define an "on course" line as a navigation aid for aircraft or other vehicles, which line comprises the boundary between adjacent zones in which the phase relationship between two radio signals are wholly different.

It is also an object of my invention to provide a radio beacon system of the character set forth in the preceding paragraph in which the phase relation between the signals in one of said zones is precisely opposite to the phase relation of the signals in the other zone.

It is a still further object of my invention to provide a radio beacon system of the character set forth in the preceding paragraphs which includes also a means carried by the vehicle for separately receiving the signals from the plurality of radio beacon transmitters, together with means for indicating in which of the two said zones the vehicle is positioned.

It is also an object of my invention to provide a radio beacon system of the character set forth in the preceding paragraphs which includes two spaced transmitters operating in synchronism with each other at like frequencies to produce a field pattern in which a radial line extended toward a selected objective comprises a boundary between adjacent zones in which phases of the resultant signal are opposite and which includes also another transmitter operating at a frequency harmonically related to said first transmitters and in phase with the resultant signal produced in one of the zones.

It is additionally an object of my invention to provide a beacon system of the character set forth in the preceding paragraph which includes also a means carried by the vehicle for receiving the resultant signal produced by the two transmitters and means for separately receiving the signal produced by the other transmitter, together with a means for indicating whether or not the signal received from the transmitter is in phase with the resultant signal received from the two first mentioned transmitters.

Other objects and advantages of my invention will be apparent from a study of the following specifications, read in connection with the accompanying drawings, wherein:

Fig. 4 is a diagram representing in graph form the manner in which the phase relationship between the two signals received at the vehicle changes with changes in position of the vehicle relative to the selected course;

Fig. 5 is a schematic wiring diagram illustrating one form of radio receiving system adapted to be carried by a vehicle and employed for the purpose of indicating to the pilot of such vehicle his position with respect to a selected course;

Fig. 6 is a vector diagram illustrating the operation of the phase determining portion of the apparatus disclosed in Fig. 5;

Figure 1:
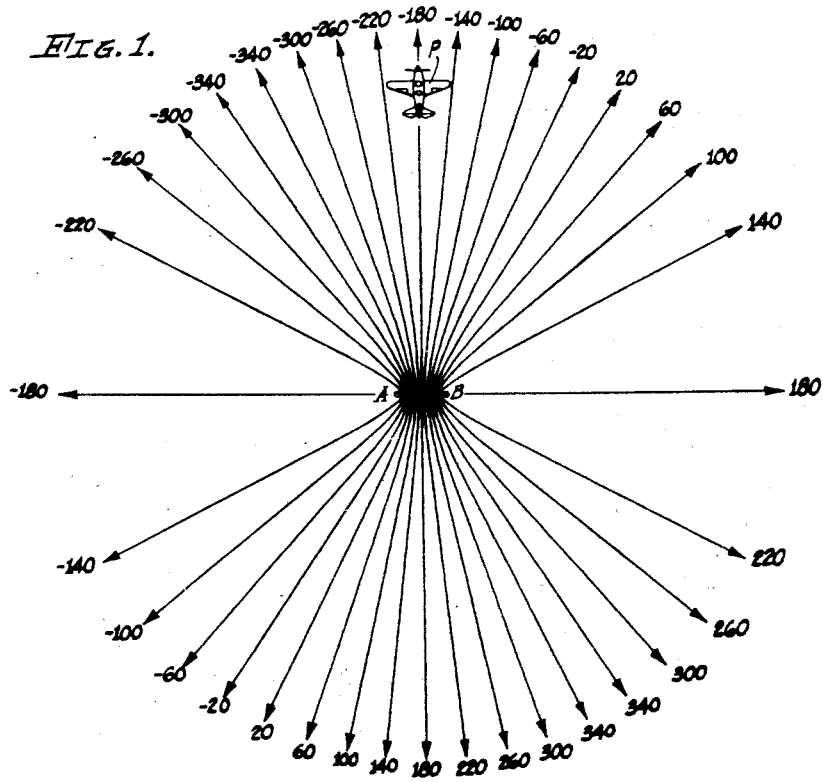
Fig. 1 is a diagrammatic view representing the field pattern which is produced by two of the plurality of radio transmitters employed in the beacon system of my invention.
Figure 2:
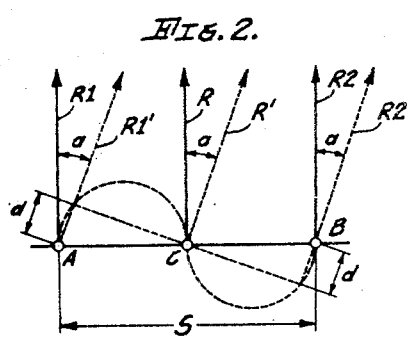
Fig. 2 is a geometrical diagram illustrating the mathematical relationships which define the phase relationship between the signals emanated from two of the three transmitters illustrated in Fig. 1 and at a point distant from said transmitters.

Referring to the drawings, I have illustrated in Figs. 1 and 2 three radio transmitting antennae A, B and C or other means for radiating radio frequency energy as being located in a straight line, the antennae A and B being spaced apart a distance S with the antenna C being positioned midway between the antennae A and B. The radial lines indicated on Fig. 1 are intended to illustrate the field pattern which is produced by simultaneous synchronized operation of the antennae A and B at the same frequency, each of these lines representing the locus of all points along which the phase relation at such points between the signals emanated from antennae A and B is constant.

The numerical values indicated on Fig. 1 represent the phase relationship between the signals when the distance S is equal to one wavelength and the antennae A and B are operated out of phase. It will be noted by having reference to Fig. 1 that the lines of constant phase relationship are straight with the exception of that portion which is closely adjacent the antennae A and B, these portions being of hyperbolic form. Actually the portions of the lines which have been indicated as straight lines are curved, being legs of hyperbolic curves, these curves so closely approaching the straight line asymptotes of the hyperbola that the difference between the hyperbolic curve and the asymptote is so slight as to be negligible. For example, at a distance exceeding three times the spacing between the antennae A and B, less than one-half of one percent error is introduced by using the asymptotes in preference to the hyperbolic curves.

In Fig. 1 I have illustrated an aeroplane P as proceeding outwardly along a field pattern line corresponding to a phase difference of 180° between the signals emanated from the antennae A and B. The diagram comprising Fig. 2 is drawn with the assumption that the plane P is located a distance from the antenna C sufficiently great to make the spacing S between the antennae A and B negligible with respect thereto. This distance is indicated in Fig. 2 by the arrow designated by the reference character R. Similar arrows R1 and R2 are used to indicate the length of lines drawn from the plane P to the antennae A and B, respectively.

If the distance R is large with respect to the distance S, the lines R1 and R2 will be parallel and of equal length so that signals emanated at a given instant of time from the antennae A and B will simultaneously arrive at the location of the plane P and will so have the same phase relationship as the signals had at the instant of their being radiated from the antennae A and B.

If, however, the plane P be angularly shifted about the antenna C by an angle $a$, the dotted lines R', R1' and R2' will represent the direction and lengths of lines drawn from the plane to the antennae C, A and B, respectively. The lines R1' and R2' may be assumed to be parallel, each making an angle $a$ with the lines R1 and R2.

It will be noted, however, that the distance R1' from the plane P to the antenna A is greater than the distance R' from the antenna C to the plane P by an amount indicated on Fig. 1 by the dimension line $d$. Similarly, the distance R2' between the plane P and the antenna B is reduced by the distance $d$. The plane P is, therefore, located a greater distance from the antenna A than it is from the antenna B, the difference in these distances being $2d$. The result is that signals simultaneously emanated from antennae A and B will arrive at the plane P at different times, the signal emanated from antenna B being the first to arrive.

If the distance $2d$ be measured in wavelengths, the difference in time of arrivals may be expressed as electric degrees equalling $720d$. The distance $d$ is in turn equal to $$\frac{S}{2} \sin a$$

Thus the phase angle between the signal emanated from antennae A and B at the location of the plane P may be expressed as $$\phi = \theta + 360 S \sin a$$

where $\theta$ is the phase relation between the signals at the antennae.

It is intended that the antennae A and B be so operated that a radial line extending from the antenna C to the selected objective comprises a line along which $$\phi = \pm 180°$$

With the arrangement shown in Fig. 1 this has been accomplished by spacing the antennae A and B a distance S equal to one wavelength and by making $$\theta = 180°$$

Figure 3:
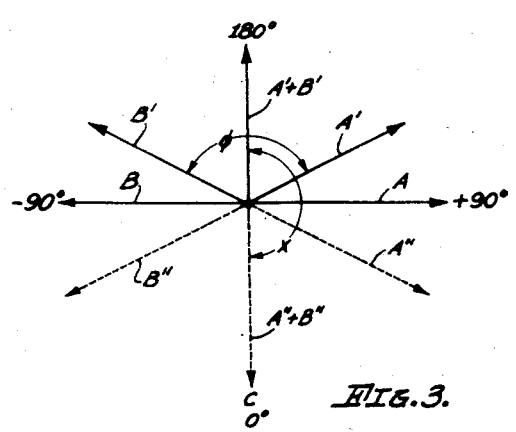
Fig. 3 is a vector diagram illustrating the phase relationship of the signals emitted by the three transmitters shown in Fig. 1.

I have illustrated in Fig. 3 by means of a vector diagram the phase relation between the signals emanated from antennae A and B. In Fig. 3 it is assumed that the current in antenna A leads the current in antenna C by 90° while the current in antenna B lags the current in antenna C by 90°. Thus the vectors designated by reference characters A and B represent the phase relation between the signals emanated from the antennae A and B and represent also the phase relation between those signals at any point along the line $$\phi = \pm 180°$$

If the plane P should be moved clockwise about the antenna C, the angle $\phi$ will reduce and the phase of each of the signals received from antennae A and B may be represented by the vectors A' and B'. It will be noted that the resultant of these signals is that indicated by the vector $A' + B'$ and that the phase angle X between this resultant and the vector C is 180°.

On the other hand, if the plane P be moved counter-clockwise about the antenna C from the position illustrated in Fig. 1, the angle $\phi$ will be increased to a value exceeding 180° and the phase relationship between the signals at the location of the plane P may be represented by the dotted vectors A" and B". The resultant of these two vectors is the vector $A''+B''$ and it will be noted that the phase angle X between this vector and the vector representing the signal emanated from antenna C is equal to zero degrees.

Thus, the phase relation between the resultant signal produced by the simultaneous operation of antennae A and B and the signal produced by antenna C will be either 180° or zero degrees, depending upon whether the plane P is on one side or the other of the 180° "on course" line.

This condition is illustrated in the graph comprising Fig. 4 wherein the values of angle X are plotted as ordinates and the values of the angles $a$ and $\phi$ are produced as abscissa. It will be noted that in the zone lying to the left of the line $a$ equals zero degrees, $\phi$ equals —180°, X has a constant and unchanging value of 180°, whereas, in the zone lying to the right of the line $a$ equals zero degrees, $\phi$ equals —180°, X has a constant and unchanging value of zero degrees. It will be further noted that the transition of the angle X from 180° to zero degrees is extremely abrupt and occurs precisely at the line $a$ equals zero degrees, $\phi$ equals —180°.

This phenomena may be employed to aid the navigation of the plane P along the "on course" line by providing on the plane P a means for receiving the resultant signal produced by the simultaneous operation of antennae A and B and a means for separately receiving the signal emanating from antenna C. If the phase between these two received signals be compared and indicated, there will be provided an indication of the position of the plane P with respect to the "on course" line. It will be understood, of course, that the vector diagram comprising Fig. 3 is based on the assumption that the antenna C is operated at the same frequency as that of antennae A and B. It will be further realized that under these circumstances it would be substantially impossible to receive the signals emanated from antenna C separately from the signals received from antennae A and B.

Figure 7:
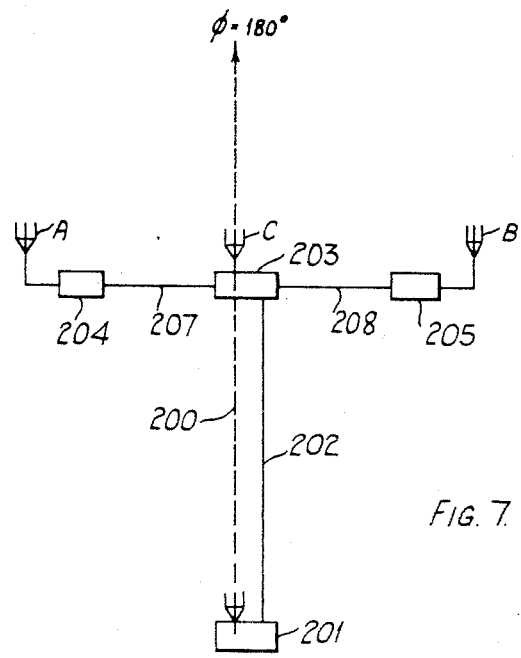
Fig. 7 is a diagram showing the geographical arrangement of the transmitting and control equipment.
Figure 8:
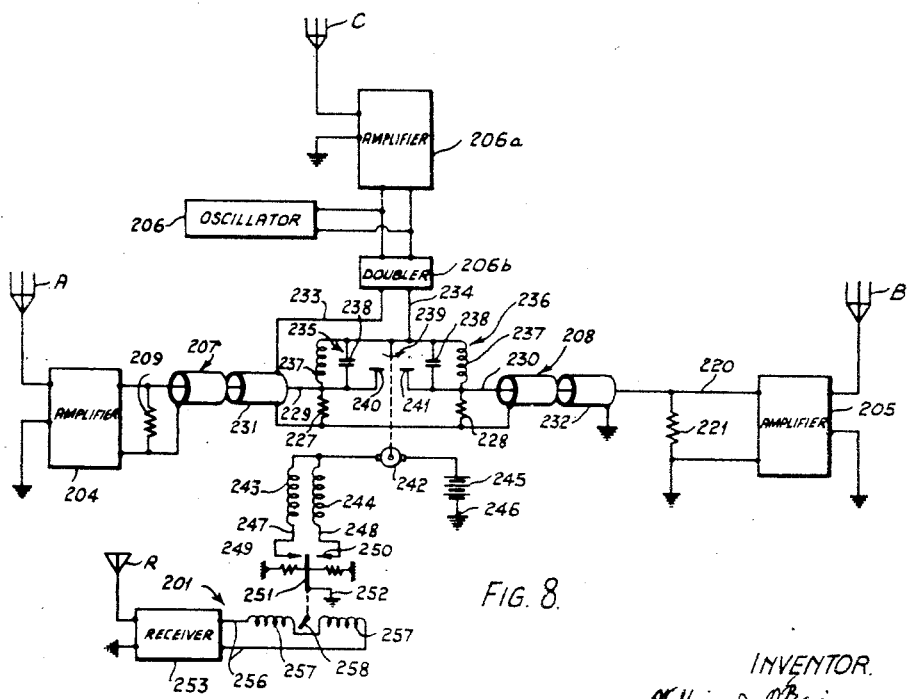
Fig. 8 is a diagram showing the apparatus used for controlling the relative phase of the transmitted signals.

I accordingly propose to operate the antennae A and B at a frequency which is harmonically related to the frequency at which the antenna C is operated. By so doing, one radio receiver in the plane P will be tuned to the frequency of the signals A B and another may be tuned to the frequency of the signal C, thus providing for the ready separate reception of these signals. This operation of the antennae A, B and C may be so performed as to maintain a desired multiple phase relation between the signals emanated from antenna C on the one hand and the signals emanated from antennae A and B on the other. Apparatus for accomplishing this result is illustrated in Figs. 7 and 8 and described in detail hereinafter.

For a more complete explanation of the manner in which properly synchronised signals of harmonically related frequency may be considered to bear a certain fixed multiple phase relationship to each other, reference should be had to my aforementioned copending application, Serial No. 420,059.

I have illustrated in Fig. 5 one form of a receiving and phase comparing device which is particularly adapted for separately receiving the signals $A+B$ and $C$ and providing a visual indication of the phase relation between these signals. In this figure I have omitted the heater circuits for the thermionic tubes employed as well as the circuits for supplying screen and plate potential to the tubes since these circuits form no part of the present invention and many well known forms of supply circuits may be successfully employed. The screen supply circuits are indicated by an arrow terminating in the legend S+, whereas, the plate supply circuits are similarly indicated by arrows terminating in the legend B+.

In Fig. 5 I have illustrated the receiving equipment as comprising two radio frequency amplifying channels, both of which are connected to a suitable receiving antenna 1 carried by the plane P. The antenna 1 is connected to a primary winding 2 of an input transformer 3, which primary winding 2 is also connected in series with the primary winding 4 of a second input transformer 5, the transformers 3 and 5 being associated, respectively, with the two radio frequency amplifying channels hereinafter referred to as the upper and lower channels.

The upper amplifying channel includes amplifier tubes, 6, 7 and 8 which are connected to form a three-stage radio frequency amplifier, the signal being fed into the amplifier from a secondary winding 9 of the input transformer 3 and the output being applied to a primary winding 10 of a coupling transformer 11.

The coupling transformer 11 serves to feed the signal to a frequency doubling stage comprising vacuum tubes 12 and 13 connected to feed into a primary winding 14 of a coupling transformer 15 a signal whose frequency is twice that of the signal amplified by the tubes 6, 7 and 8. The output of the coupling transformer 15 is fed to an amplifying tube 16 whose output appears across a transformer primary winding 17.

Similarly, the lower channel comprises vacuum tubes 18, 19, 20, 21 and 22 interconnected to form a five-stage radio frequency amplifier into which signals are fed from a secondary winding 23 of the input transformer 5 and whose output appears across a transformer primary winding 24.

The upper channel is tuned to the frequency of the signals emitted from the antenna C, whereas, the lower channel is tuned to the frequency of the signal $A+B$. The lower channel is designed to normally operate at maximum amplification since the resultant signal $A+B$ is ordinarily of relatively low intensity when the plane is near the "on course" line.

A suitable manual control comprising resistances 25 and 26 for varying the grid bias of one or more of the amplifier tubes 18—22 may be employed to reduce the amplification under those circumstances when the plane P wanders so far from the "on course" line that the signal $A+B$ has a considerable magnitude. The upper channel is preferably provided with an automatic volume control for the purpose of insuring a substantially constant signal output, such automatic volume control including a diode element associated with the tube 16 and connected to provide a negative voltage on an AVC bus 27 which is proportional to the strength of signal appearing across the winding 17. The bus 27 may be used as a ground return for the grids of one or more of the tubes 6–8 and so operates to vary the grid bias on these tubes and the amplification of the amplifier. This variation is so arranged as to provide a substantially constant signal across the winding 17 irrespective of changes in signal strength picked up by the antenna 1.

For a complete discussion and explanation of the type of inter-stage coupling employed on the two amplifier channels and for a discussion of the various means employed to maintain adequate phase stability in each of the amplifier channels, reference should be had to my copending application Serial No. 420,059. Suffice it to say that the constants of the various circuit components are so chosen as to provide a minimum shift in the phase of the signal as it progresses through the amplifiers and such as to produce to the greatest extent possible a compensating phase shift in one of the amplifiers as a result of conditions tending to produce a corresponding phase shift in the other amplifier.

The upper channel is preferably provided with a phase shifting device comprising a small variable condenser 28 connected in parallel with the secondary winding 9. This condenser may, as is described in my above identified copending application, be employed to slightly detune the input circuit of the tube 6 to thereby effect a relatively large shift in the phase of the signal applied to the grid of that tube. As is pointed out in the copending application, the phase of the signal may be shifted through a substantial angle without materially affecting the tuning of the input circuit. The condenser 28 is normally adjusted to provide an output signal which is substantially in phase with the output signal produced by the lower channel.

The transformer primary winding 17 is operatively associated with a secondary winding 29, one side of which is connected as by means of a conductor 30 to the plates of a pair of rectifier tubes T1 and T2. The other side of the winding 29 is connected by means of a conductor 31 to ground through a resistance 32, which resistance is preferably by-passed by a condenser 33.

Similarly, the transformer primary winding 24 is operatively associated with secondary windings 34 and 35, the inner ends of these windings being interconnected as by means of a condenser 36 and connected to ground as by a conductor 37. The outer terminal of the winding 34 is connected to the cathode of tube T1 while the outer terminal of winding 35 is connected to the cathode of the tube T2. As above noted, the inner terminal of the winding 35 is connected to ground by the conductor 37, whereas, the inner terminal of the winding 34 is connected as by means of a conductor 38 through a resistance 39 to the afore-mentioned conductor 31. The conductor 38 is also extended into connection with the grid of an amplifying tube 40 through a blocking resistance 41.

The operation of this portion of the apparatus can best be understood by having reference to the vector diagram shown in Fig. 6. In that diagram the vector $E_c$ is taken as a reference vector and represents the voltage resulting from the reception of the signal emanated from antenna C and appearing across the winding 29. The vectors indicated by the reference characters $+E_{AB}$ and $-E_{AB}$ represent, respectively, the voltage appearing across the windings 34 and 35 and resulting from the reception of the resultant signal transmitted from the antennae A and B.

It will be recalled that the intention is to adjust the condenser 28 so as to dispose the vector $+E_{AB}$ in phase with the vector $E_c$. However, a slight phase shift has been introduced into the diagram of Fig. 6 for the purpose of separating the vectors to more clearly show the vector relationships.

It will be noted that the voltage which is applied between the cathode and plate of the rectifier tube T1 is the vector sum of the voltages $E_c$ and $+E_{AB}$, such vector sum being indicated by the vector $E_{T1}$, whereas, the voltage which is applied between the plate and cathode of the rectifier tube T2 is the vector sum of the voltage $E_c$ and $-E_{AB}$, such vector sum being indicated by the vector $E_{T2}$.

It will be noted that $E_{T1}$ exceeds $E_{T2}$ with a result that the direct current flowing through the tube T1 will exceed in magnitude the direct current flowing through the tube T2. Accordingly a direct voltage drop will be produced in the resistance 39 which exceeds the corresponding direct voltage drop produced in the resistance 32, these resistances preferably being of equal value so that the voltages produced across these resistances will bear the same ratio as the ratio of the vectors $E_{T1}$ and $E_{T2}$.

It will also be noted that the direct current which flows through the resistors 32 and 39 flows through these series connected resistances in opposite directions; that is, from the free ends to the interconnected ends thereof. The result is that the polarity of the voltage produced across these resistances is opposed so that the voltage measured between conductor 38 and ground represents the difference between the voltages produced across the resistances 32 and 39.

When conditions are such as are represented in Fig. 6; that is when the voltage produced across the resistance 39 exceeds that which is produced across the resistance 32, the conductor 38 will have a positive potential with respect to ground. This corresponds to the condition which exists when the plane P is disposed to the right of the line $a$ equals zero degrees, $\phi$ equals $-180°$, under which conditions $+E_{AB}$ is substantially in phase with $E_{T1}$. If, however, the plane P is caused to move to the other side of the "on course" line, the angle X will change abruptly from zero degrees to 180° with the result that the vectors $+E_{AB}$ and $-E_{AB}$ of Fig. 6 will inter-change positions so that $E_{T2}$ will exceed $E_{T1}$. This will then reverse the relative magnitudes of the direct voltages across the resistances 32 and 39 so that the conductor 38 will become negative with respect to ground. Thus the polarity of the voltage appearing on the conductor 38 indicates which side of the "on course" line the plane is located.

In order that this voltage may be visually indicated, it is applied to the grid of the tube 40 through the resistance 41. The tube 40 is connected in an indicating circuit with a galvanometer or other suitable visual indicating means 42, which is connected as the balance responsive device in a Wheatstone bridge circuit, three of the four resistance elements of which are fixed, whereas, the fourth resistance element comprises the plate to cathode resistance of the tube 40. This tube is normally biased to operate on the straight line portion of the grid voltage-plate current characteristic so that as the voltage on conductor 38 changes polarity from positive to negative with respect to ground, the plate to cathode resistance of the tube 40 will be correspondingly changed.

The values of resistances chosen for the Wheatstone bridge circuit are such as to provide a zero center indication on the galvanometer 42 when the grid of the tube 40 is maintained at ground potential. Thus, the galvanometer will be caused to swing to the right or to the left as the voltage on conductor 38 becomes positive or negative. The indicator 42 thus provides a visual indication of the position of the plane P with respect to the "on course" line, and it will be noted that the only time the galvanometer 42 can indicate zero is when the plane P is precisely on the "on course" line, at which time the voltages $+E_{AB}$ and $-E_{AB}$ are equal to zero, $E_{T1}$ and $E_{T2}$ both being equal to $E_C$ and conductor 38 being at ground potential.

The indicating circuit just described is extremely sensitive, this extreme sensitivity resulting from the fact that the signals which are applied to the phase discriminating circuit involving the tubes T1 and T2 change abruptly from an in phase to an out phase condition upon movement of the plane P from one side of the "on course" line to the other.

As an example of the sensitivity which may be obtained with the beacon system of my invention assume that the antennae A and B are separated by a distance six wavelengths and that the intensity of radiation emanated from antennae A and B is five times that emanated from antenna C. Assume also that a voltage difference between $E_{T2}$ and $E_{T1}$ of Fig. 6 equal to $E_C$ is sufficient to give a full scale deflection on the galvanometer 42 and that a ten percent of full scale deflection will provide a positive indication to the pilot of the aircraft as to whether or not he is proceeding along the "on course" line. Assuming that the "on course" line is along the line $\phi$ equals $-180°$, $a$ equals $0°-00'$, a positive indication comprising ten percent of a full scale deflection on the galvanometer 42 will result from shifting the plane to a course in which $a$ is equal to $0°-01'$ if both of the received signals are equally amplified.

To appreciate the degree of this sensitivity, assume that the beacon system is set up in London in such manner as to extend the "on course" line $a$ equals $0°-00'$ to the city of Berlin, approximately six hundred miles distant from London. The "on course" zone or zone within which it will be difficult for the pilot to ascertain whether or not he is to the right or the left of the "on course" line is an angular zone having an angular width of $0°-02'$. This angular zone has a width of approximately one-third of a mile at a six hundred mile radius or will serve to guide a bombing plane from London to Berlin with an accuracy of approximately four city blocks.

The foregoing description has been based on the assumption that antenna C is so operated that the current therein leads the current in antenna B by the same amount as it lags the current in antenna A. This was for the purpose of providing an in-phase relation between the voltages $+E_{AB}$ and $E_C$. It will be noted, however, that this phase relation between antenna C and antennae A and B is not actually a requirement since the condenser 28 permits adjustment of the phase between the signals to bring $+E_{AB}$ and $E_C$ into an in-phase relation with each other. The real requirement is the maintenance of such phase stability that the line $\phi = \pm 180°$ always lies along the "on course" line and that $E_C$ does not vary greatly from an in-phase relation with $+E_{AB}$.

The requirement for the maintenance of such phase direction as will hold the line $$\phi = 180°$$

along the "on course" line may be met by employing suitable phase regulating equipment in conjunction with the transmitting apparatus, as for example by employing a control apparatus such as is illustrated in Figs. 7 and 8.

As is shown in Fig. 7, the transmitting antennae A and B are spaced from each other and are so operated as hereinbefore described as to extend the equi-phase line $$\phi = 180°$$

perpendicularly to the base line joining the antennae A and B. This equi-phase line is identified in Fig. 7 by the reference character 200. At a convenient location along this line and preferably spaced a substantial distance from the transmitting antennae, I place a control receiver 201 which is connected as by means of a control cable 202 to a phase control apparatus 203 which may be conveniently positioned at the location of the transmitting apparatus associated with antenna C. The transmitters associated with antennae A and B are represented at 204 and 205 and these transmitters are preferably coupled as by means of transmission lines 207 and 208 to the control apparatus 203.

In Fig. 8 I have illustrated in detail the control apparatus which is represented diagrammatically in Fig. 7. In accordance with the form of the invention which is shown in Fig. 8, an oscillator 206 is employed as a source of radio frequency energy. This source may be coupled as shown to a power amplifier 206a which feeds antenna C. If the oscillator generates signals of the same frequency as those intended to be radiated from antenna C, the amplifier 206a may constitute a conventional radio frequency power amplifier. If, however, the signals generated by the oscillator 206 have a frequency which is a sub-multiple of the frequency desired to be radiated from antenna C, the amplifier 206a may be preceded by suitable and appropriate frequency multiplying stages. The output of the oscillator 206 is also coupled to a frequency doubler 206b, the output of which is connected through the transmission lines 207 and 208 to the transmitting apparatus 204 and 205, coupled respectively to the antennae A and B. As is the case with the amplifier 206a, the amplifier 204 and 205 may be preceded by any frequency multiplying stages which may be required to establish the desired operating frequencies for antennae A and B.

The transmission lines 207 and 208 may be of any conventional construction although they have been illustrated in Fig. 8 as comprising coaxial cables. The outlying ends of the cables 207 and 208 are coupled respectively to the inputs of the amplifier 204 and 205 by means of terminal resistances 209 and 221. These resistances are each preferably made equal to the surge impedance of the transmission lines. The input circuits for the transmission lines may comprise resistances 227 and 228 connected in shunt across the transmission lines between the central conductors 229 and 230 thereof and the outer grounded sheaths 231 and 232.

The output of the doubler 206b is coupled to the transmission lines 207 and 208 as by extending one supply conductor 233 into connection with the sheaths 231 and 232 and by extending the other supply conductor 234 to the central conductors 229 and 230 through a pair of identical tank circuits 235 and 236, each including an inductance 237 and a shunt connected condenser 238.

I employ also a phase shift condenser of the split stator variable type, the movable element 239 thereof being connected to the conductor 234 while one of the stator portions 240 is connected to the conductor 229 and the other stator portion 241 is connected to the conductor 230. It will be seen that the movement of the movable element 239 from a neutral or central position will detune the tank circuits 235 and 236 in opposite directions so as to shift in opposite directions the phase of the voltage developed across the input resistances 227 and 228.

In order that the shifting of the movable element 239 may be effected automatically, I employ a drive means which may comprise a reversible electric motor 242. Although any form of reversible motor may be used, I have chosen for illustration in Fig. 8 a motor of the split series field type which includes two series field windings 243 and 244, so arranged that if the motor is energised through one of the windings the direction of rotation of the motor will be opposite to that resulting from the energization of the motor through the other winding. One terminal of the motor 242 may be connected to a suitable source of power illustrated in Fig. 8 as comprising a battery 245, the other terminal of which is connected to ground as at 246. The free end terminals of each of the field windings 243 and 244 are extended by means of control conductors 247 and 248 to left and right contacts 249 and 250, respectively, of a control switch including a balanced switch arm 251, which is in turn connected to ground as by means of a conductor 252. The control switch 251 is preferably located adjacent the receiving apparatus 201 and the control conductors 247 and 248 comprise the control cable shown at 202 in Fig. 7.

The remainder of the control receiver apparatus 201 comprises a receiver 253 which may be identical to that hereinbefore described with reference to Fig. 5 of the drawings. The receiver 253 is connected to a receiving antenna R which is geographically positioned on the line 200.

The receiver which is illustrated in Fig. 5 of the drawings and hereinbefore described includes an indicating galvanometer 42. For use as a control receiver this galvanometer is removed and in its stead is placed a polarised switch mechanism comprising coils 257, operable to move a movable element 258, which is in turn mechanically connected to the movable switch member 251.

It will be seen that when the phase of the signals radiated by antennae A and B is such as to cause the line 200 to pass through the receiving antenna R, the movable element 258 will occupy a neutral or central position, as will the movable switch arm 251 connected thereto. However, should the relative phase of the A and B signals change so as to dispose the line 200 to one side of the receiving antenna R, the apparent shift in position of the receiving antennae with respect to the "on course" line 200 will so actuate the receiving apparatus as to cause a movement of the movable member 258. This, through actuation of the switch arm 251, will energise the motor 242 and cause a movement of the movable condenser 239. The control connections are so arranged that the resulting movement of the condenser 239 is in such direction as to produce a phase shift of the direction required to shift the "on course" line back toward the receiving antenna R. When this condition obtains, the motor is de-energised and the apparatus continues operating under the new adjustment. It will be seen that a shift in phase in the opposite direction will result in a correction in a direction opposite to that just described, so that the apparatus operates automatically to maintain that phase relationship between the A and B signals which is required to maintain the equi-phase line 200 in alignment with the receiving antenna R.

The phase control apparatus and other features of invention which are described and illustrated but not claimed herein, are disclosed also and claimed in my copending application, Serial No. 438,712, filed April 13, 1942, entitled "Radio transmission system," and in a division thereof, Serial No. 509,023, filed November 5, 1943 and entitled "Radio frequency transmission system." Reference should also be had to my copending application, Serial No. 701,745, filed October 7, 1946, and entitled "Radio beacon system," a continuation-in-part of my copending application, Serial No. 420,059, filed November 22, 1941, and entitled "Radio beacon system."

From the foregoing it will be observed that I have provided a radio beacon system which serves to define an "on course" line representing the boundary between adjacent zones in which the phase relation between two separate and distinct radio signals in one zone is precisely opposite to the phase relation of those signals in the other zone.

It will also be observed that I have provided a novel receiving and indicating apparatus whereby the pilot of an aircraft or other vehicle may be apprised visually of the location of the aircraft or vehicle with respect to this "on course" line.

While I have in the foregoing referred to the "on course" line as a "line" and while I have referred to the field pattern as comprising lines of constant phase relationship, it will be appreciated that these "lines" actually represent a horizontal section of the field, which field is in reality characterised by hyperbolic surfaces. It will also be realized that the "line" referred to as defining the boundary between the zones of opposite phase relationship is not actually a line but a surface which defines the boundary between three dimensional zones of opposite phase relationship.

While I have shown and described the preferred embodiment of my invention, I do not desire to be limited to any of the details of construction shown or described herein, except as defined in the appended claims.

I claim:

1. The method of guiding a vehicle along a selected course which consists in simultaneously radiating from spaced antennae synchronised radio waves having a fixed phase relation to each other to define a locus of points of phase opposition between said synchronised waves and coinciding with said selected course, simultaneously radiating from another antenna spaced from said spaced antennae radio waves harmonically related to the waves radiated from said spaced antennae and bearing a fixed multiple phase relation thereto, receiving the waves from said other antenna at said vehicle, separately receiving at said vehicle the combined waves from said spaced antennae, so adjusting the phase of said received waves as to establish a substantially in-phase relation therebetween when said vehicle is positioned at one side of said selected course, comparing the phase of said received waves to determine their phase relation, and distinguishably indicating the substantially in-phase and phase opposition relation between said received waves.

2. The method of guiding a vehicle along a selected course which consists in simultaneously radiating from spaced antennae synchronized radio waves of like frequency having a fixed phase relation to each other to define a locus of points of phase opposition between said synchronized waves and coinciding with said selected course, simultaneously radiating from another antenna spaced from said spaced antennae radio waves harmonically related to the waves radiated from said spaced antennae and bearing a fixed multiple phase relation thereto, receiving the waves from said other antenna at said vehicle, separately receiving at said vehicle the combined waves from said spaced antennae, multiplying the frequency of one of said separately received waves to provide two radio frequency signals of identical frequency, so adjusting the phase of said received waves as to establish a substantially in-phase relation therebetween when said vehicle is positioned at one side of said selected course, comparing the phase of said signals to determine their phase relation, and distinguishably indicating the substantially in-phase and phase opposition relation between said signals.

3. The method of guiding a vehicle along a selected course which consists in producing a radio frequency field in which the time phase of the radio frequency voltage measured at said vehicle is reversed when said vehicle is moved from one side of said selected course to the other, producing a second radio frequency field in which the time phase of the radio frequency voltage measured at said vehicle is independent of movement of said vehicle from one side to the other of said selected course, and employing the time phase of said second radio frequency voltage as a reference to permit ascertainment of the reversal of time phase of said first radio frequency voltage whereby the location of said vehicle with respect to said selected course may be indicated by comparing the time phase of said first radio frequency voltage with the time phase of said second radio frequency voltage.

4. A radio beacon for aiding the navigation of a vehicle along a selected course which comprises: a geographically fixed radio transmitting system including spaced antennae, means for simultaneously radiating from two of said antennae radio waves of like frequency having a fixed phase relation such that a locus of points of phase opposition between said radio waves coincides with said selected course, and means for radiating from another of said antennae other radio waves of a frequency harmonically related to the frequency of said waves of like frequency and bearing a fixed multiple phase relation thereto; a radio receiver on said vehicle for receiving said other waves; another radio receiver on said vehicle for receiving separately from said other waves the combined waves of like frequency; frequency multiplying means for at least one of said receivers for producing from said receivers a pair of radio frequency signals of like frequency; means for adjusting the phase of one of said signals relative to the other to establish a substantially in-phase relation therebetween when said vehicle is positioned at one side of said selected course; means for comparing the phase of said signals to determine their phase relation; and means for distinguishably indicating the substantially in-phase and phase opposition relation between said radio frequency signals.

5. The method of producing a distinguishable radio frequency field pattern which consists in radiating radio frequency waves of a given frequency from one antenna, simultaneously radiating from two other antennae spaced from each other and from said one antenna radio frequency waves of like frequency harmonically related to said given frequency, maintaining a fixed phase relation between said waves of like frequency, and maintaining fixed multiple phase relations between each of said waves of like frequency and said waves of given frequency.

6. The method of producing a distinguishable radio frequency field pattern to serve as an aid in navigating a vehicle along a selected course which consists in simultaneously radiating synchronized radio frequency waves of a given frequency from two antennae spaced from each other, maintaining a fixed phase relation between said waves to define a locus of points of phase opposition between the synchronized waves coinciding with said selected course, simultaneously radiating from another antenna positioned midway between said two antennae other radio frequency waves of a frequency harmonically related to said given frequency, and maintaining a fixed multiple phase relation between said other waves and each of said waves of given frequency.

7. The method of navigating a vehicle by employing as a guide a boundary surface between adjacent zones of a dual signal radio frequency field which includes the steps of radiating signals of unlike but harmonically related frequencies, maintaining the signals in one zone substantially in a multiple in-phase relation, and maintaining the signals in the other zone substantially in multiple phase opposition.

8. The method of guiding a vehicle along a selected course which consists in producing a dual signal radio frequency field of unlike but harmonically related frequencies, and maintaining the multiple time phase of the radio frequency voltage measured at one side of said selected course in opposition to the multiple time phase of the radio frequency voltage measured at the other side of said selected course, whereby a reversal of said time phase as said vehicle crosses said course may be employed as an indication of the location of said vehicle with respect to said course.

9. The method of navigating the vehicle by employing as a guide a boundary surface between adjacent zones of a dual signal radio frequency field which includes the steps of establishing a first radio frequency field, maintaining the signals of said field in one zone in phase opposition to the signals thereof in the adjacent zone, establishing a second radio frequency field having a frequency different but harmonically related to the frequency of said first radio frequency field, and maintaining fixed the phase relation of the signals of said second field in both of said adjacent zones, whereby the signals of said second field may be employed as a reference against which the phase of the signals of said first field may be compared for distinguishably identifying said adjacent zones.

WILLIAM J. O'BRIEN.